United States Patent
Kubota et al.

(10) Patent No.: US 12,378,740 B2
(45) Date of Patent: Aug. 5, 2025

(54) BERTH FOR MULTI-PURPOSE DISASTER RESPONSE SHIP AND HARBOR STRUCTURE

(71) Applicant: KAWASAKI JUKOGYO KABUSHIKI KAISHA, Kobe (JP)

(72) Inventors: Tetsuya Kubota, Kobe (JP); Tomoki Kuwabara, Kobe (JP); Yasuyuki Haneda, Kobe (JP); Susumu Ikeda, Kobe (JP); Minoru Yokoyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 470 days.

(21) Appl. No.: 18/014,247

(22) PCT Filed: May 27, 2021

(86) PCT No.: PCT/JP2021/020156
§ 371 (c)(1),
(2) Date: Jan. 3, 2023

(87) PCT Pub. No.: WO2022/024532
PCT Pub. Date: Feb. 3, 2022

(65) Prior Publication Data
US 2023/0257953 A1  Aug. 17, 2023

(30) Foreign Application Priority Data
Jul. 29, 2020  (JP) .................................. 2020-128224

(51) Int. Cl.
*E02B 3/06*  (2006.01)
*E02B 3/20*  (2006.01)

(52) U.S. Cl.
CPC . *E02B 3/06* (2013.01); *E02B 3/20* (2013.01)

(58) Field of Classification Search
CPC ................ B63C 1/12; E02B 3/06; E02B 3/20
See application file for complete search history.

(56) References Cited

FOREIGN PATENT DOCUMENTS

| JP | 2002-068078 A | | 3/2002 | |
| JP | 2002-068078 | * | 3/2022 | ............. B63B 35/44 |

OTHER PUBLICATIONS tideslide.com website Feb. 2, 2020 (Year: 2020).*

* cited by examiner

*Primary Examiner* — Timothy D Collins
(74) *Attorney, Agent, or Firm* — Oliff PLC (57) ABSTRACT

A berth for a multi-purpose disaster response ship includes: a quay at which the multi-purpose disaster response ship is berthed; a building located along the quay, including at least one quay-facing gate, and sharing at least one common purpose with the multi-purpose disaster response ship; a horizontal movement restrainer that restricts and permits horizontal movement of the multi-purpose disaster response ship relative to the quay; and a vertical movement restrainer that adjusts a vertical location of the multi-purpose disaster response ship to a specified level relative to the quay and that restricts and permits vertical movement of the multi-purpose disaster response ship situated at the specified level.

16 Claims, 6 Drawing Sheets

BERTH FOR MULTI-PURPOSE DISASTER RESPONSE SHIP AND HARBOR STRUCTURE

This is a U.S. National Phase of International Application No. PCT/JP2021/020156 filed May 27, 2021, which claims the benefit of Japanese Application No. 2020-128224 filed Jul. 29, 2020. The disclosure of the prior applications is hereby incorporated by reference herein in its entirety.

TECHNICAL FIELD

The present disclosure relates to a berth for a multi-purpose disaster response ship and a harbor structure including a berthed multi-purpose disaster response ship.

BACKGROUND ART

Ships equip themselves with accommodation installations, storage installations for foodstuffs and other goods, and lifeline supply installations such as an installation for electricity generation. Multi-purpose disaster response ships are known which make use of such advantages of ships and which are adapted to, in the event of emergencies such as large-scale natural disasters and pandemics, approach the emergency-affected areas from the sea. In the event of emergencies such as large-scale disasters, multi-purpose disaster response ships can be used for various purposes such as medical activities, search and rescue of missing people, transportation of manpower and goods, and support activities for disaster victims (e.g., provision of foodstuffs, water, and bath service). Some multi-purpose disaster response ships whose primary function is aimed at on-board medical practice are called hospital ships. Hospital ships are furnished with pieces of medical equipment such as surgery rooms, intensive care units, and advanced medical materials or devices which are equivalent to those of hospitals on land.

Emergencies such as large-scale natural disasters and pandemics for which hospital ships are required do not occur frequently. Thus, even if a hospital ship is built by spending a lot of expenses, the hospital ship serves only for limited occasions unless it can be effectively used in ordinary times.

For example, Patent Literature 1 describes a floating structure on which disaster relief goods are loaded in the event of a disaster and which is towed to the disaster-affected area by a tugboat. Patent Literature 1 proposes using the floating structure as a container yard for storage of containers in ordinary times.

CITATION LIST

Patent Literature

PTL 1: Japanese Laid-Open Patent Application Publication No. 2002-68078

SUMMARY OF INVENTION

Technical Problem

To allow a multi-purpose disaster response ship to depart quickly in times of emergency, it is desired that in ordinary times the multi-purpose disaster response ship be berthed in a specified harbor. However, ships are susceptible to phenomena such as waves, wind, and tide. Under bad weather conditions involving high waves, ships rock violently, and on-board activities are limited by the rocking motions.

The present disclosure has been made in view of the above circumstances, and an object of the present disclosure is to provide a berth for a multi-purpose disaster response ship and a harbor structure including a berthed multi-purpose disaster response ship, the berth and harbor structure being adapted to allow the multi-purpose disaster response ship to stay without rocking in ordinary times and depart quickly in times of emergency.

Solution to Problem

A berth for a multi-purpose disaster response ship according to one aspect of the present disclosure includes:
  a quay at which the multi-purpose disaster response ship is berthed;
  a building located along the quay, including at least one quay-facing gate, and sharing at least one common purpose with the multi-purpose disaster response ship;
  a horizontal movement restrainer that restricts and permits horizontal movement of the multi-purpose disaster response ship relative to the quay; and
  a vertical movement restrainer that adjusts a vertical location of the multi-purpose disaster response ship to a specified level relative to the building and that restricts and permits vertical movement of the multi-purpose disaster response ship situated at the specified level.

A harbor structure according to one aspect of the present disclosure includes:
  a quay at which the multi-purpose disaster response ship is berthed;
  a building located along the quay, including at least one quay-facing gate, and sharing at least one common purpose with the multi-purpose disaster response ship;
  a horizontal movement restrainer mounted on the multi-purpose disaster response ship or the quay to restrict and permit horizontal movement of the multi-purpose disaster response ship relative to the quay; and
  a vertical movement restrainer that adjusts a vertical location of the multi-purpose disaster response ship to a specified level relative to the quay and that restricts and permits vertical movement of the multi-purpose disaster response ship situated at the specified level.

In the berth for the multi-purpose disaster response ship and the harbor structure which are configured as described above, the horizontal movement restrainer restricts horizontal movement of the multi-purpose disaster response ship relative to the quay. Additionally, the vertical movement restrainer adjusts the vertical location of the multi-purpose disaster response ship to the specified level relative to the building, and restricts vertical movement of the multi-purpose disaster response ship relative to the quay. Thus, the multi-purpose disaster response ship maintains a constant position relative to the quay without rocking under the effect of wind, waves, and tide. Thus, in ordinary times, the multi-purpose disaster response ship can stay in the berth or harbor structure without rocking, and on-board activities are not limited due to rocking motions. As such, in ordinary times, the multi-purpose disaster response ship can be used as an auxiliary structure for the building or a structure that enhances the functionality of the building. In times of emergency, the multi-purpose disaster response ship can be quickly made ready for departure by removing the restrictions imposed by the horizontal and vertical movement restrainers.

Advantageous Effects of Invention

The present disclosure can provide a berth and harbor structure for a multi-purpose disaster response ship, the berth and harbor structure being adapted to allow the multi-purpose disaster response ship to stay without rocking in ordinary times and depart quickly in times of emergency.

DESCRIPTION OF EMBODIMENTS

Figure 1:
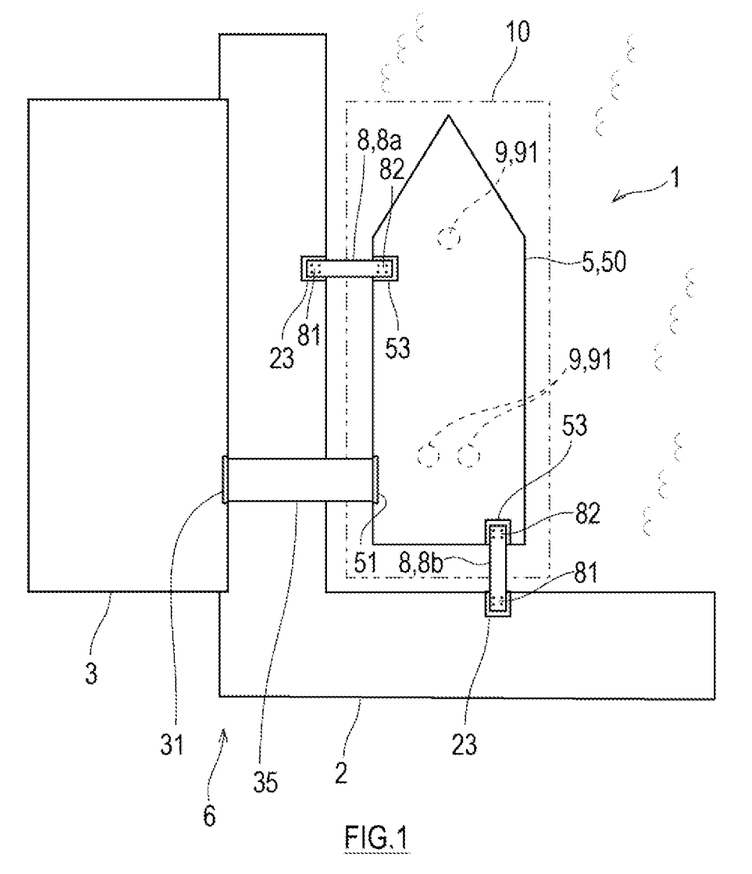
FIG. 1 is a plan view showing the overall configuration of a harbor structure according to an exemplary embodiment of the present disclosure.

Hereinafter, embodiments of the present disclosure will be described with reference to the drawings. FIG. 1 is a plan view showing the overall configuration of a harbor structure 1 according to an exemplary embodiment of the present disclosure. As shown in FIG. 1, the harbor structure 1 according to this exemplary embodiment includes a berth 6 and a hospital ship 50. The hospital ship 50 is an example of a multi-purpose disaster response ship 5.

Hospital Ship 50 (Multi-Purpose Disaster Response Ship 5)

The hospital ship 50 stays in the berth 6 in ordinary times. The primary function of the hospital ship 50 is aimed at on-board medical practice. The hospital ship 50 is furnished with pieces of medical equipment such as a surgery room, an intensive care unit, and an advanced medical material or device which are equivalent to those of medical facilities on land. In the event of an emergency such as a large-scale natural disaster or a pandemic, the hospital ship 50 departs from the berth 6, approaches the emergency-affected area from the sea, and is used for medical activities.

The hospital ship 50 includes at least one boarding gate 51. The boarding gate 51 is typically located on the portside of the hospital ship 50, but not limited to this location.

Berth 6

The berth 6 includes a quay 2, at least one building 3, and a vertical movement restrainer 9. In the berth 6 there is a berthing zone 10 where the hospital ship 50 is berthed. The size of the berthing zone 10 is tailored to that of the hospital ship 50. For example, the berthing zone 10 as viewed in plan is generally in the shape of a rectangle somewhat greater than the outer shape of the hospital ship 50.

The quay 2 is an installation alongside which the hospital ship 50 is berthed in the harbor. The quay 2 may be a quay with a known structure, such as a sheet pile quay, gravity quay, or pier quay. A part of the quay 2 may be a different form of installation such as a pier. The quay 2 is located along at least one of the four sides of the berthing zone 10 as viewed in plan. The quay 2 may be located along two or three of the four sides of the berthing zone 10 as viewed in plan.

The building 3 is located on land and along the quay 2. The building 3 is stationary on land and includes a roof, a peripheral wall, and at least one quay-facing gate 31. The quay-facing gate 31 opens toward the berthing zone 10. The building 3 and the multi-purpose disaster response ship 5 share at least one common purpose. In this exemplary embodiment, the multi-purpose disaster response ship 5 is the hospital ship 50, and the building 3 is a medical facility. The hospital ship 50 and the building 3 share the purpose of providing medical services. The medical facility may be a hospital or clinic.

The vertical movement restrainer 9 adjusts the vertical location of the hospital ship 50 to a specified level relative to the building 3. As the building 3 is fixed in position relative to the quay 2, it can be said that the vertical movement restrainer 9 adjusts the vertical location of the hospital ship 50 to a specified level relative to the quay 2. When the hospital ship 50 is at the specified level, there is a given relationship between the vertical location He of the boarding gate 51 of the hospital ship 50 and the vertical location of the quay-facing gate 31 of the building 3.

For example, the vertical location He of the boarding gate 51 of the hospital ship 50 situated at the specified level may be substantially the same as the vertical location of the quay-facing gate 31 of the building 3. The phrase "substantially the same" is intended to encompass the case where a straight line drawn between the boarding gate 51 of the hospital ship 50 and the quay-facing gate 31 of the building 3 is horizontal and the case where the gradient of the straight line (the ratio of the vertical distance between the gates to the horizontal distance between the gates) is $\frac{1}{12}$ or less.

For example, the difference between the vertical location He of the boarding gate 51 of the hospital ship 50 situated at the specified level and the vertical location of the quay-facing gate 31 of the building 3 may be a given value (or in a given numerical range).

The vertical movement restrainer 9 is configured to restrict and permit vertical movement of the hospital ship 50 from the specified level relative to the quay 2. That is, the hospital ship 50 adjusted to the specified level is held at the specified level by the vertical movement restrainer 9.

Figure 2:
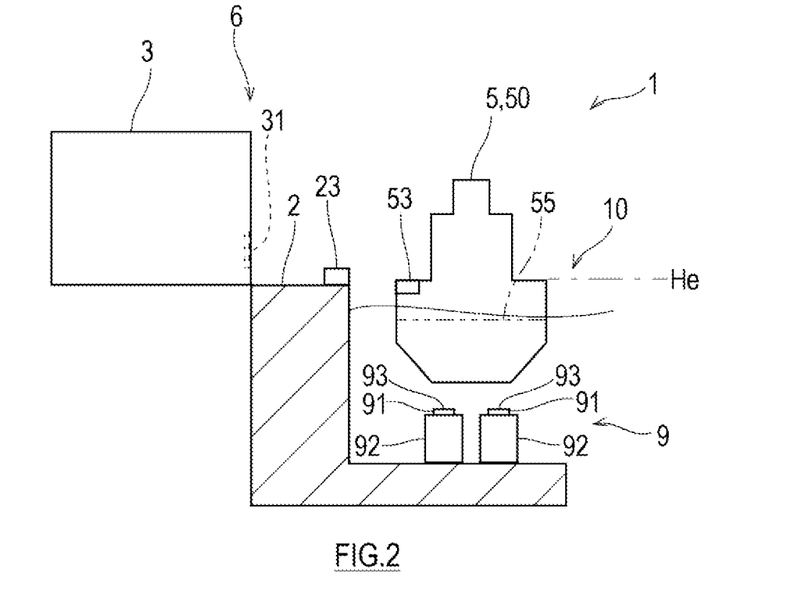
FIG. 2 is a cross-sectional view of the harbor structure and illustrates the configuration of a vertical movement restrainer.

The vertical movement restrainer 9 according to this exemplary embodiment includes at least three pillars 91 that support the bottom of the hospital ship 50 and an elevator 92 that raises and lowers the pillars 91.

FIG. 2 illustrates the vertical movement restrainer 9 of the harbor structure 1 of FIG. 1. As shown in FIG. 2, each of the pillars 91 extends vertically from the sea bottom in the berthing zone 10 and includes at its top a ship bottom support 93. The pillars 91 bring their ship bottom supports 93 into contact with the bottom of the hospital ship 50 to support the hospital ship 50.

The elevator 92 is configured to vertically raise and lower the ship bottom supports 93 of the pillars 91. The elevator 92 may include, for example, hydraulic cylinders.

Horizontal Movement Restrainer 8

The harbor structure 1 further includes at least one horizontal movement restrainer 8. The horizontal movement restrainer 8 may be mounted on the berth 6 or the hospital ship 50. The horizontal movement restrainer 8 is configured to restrict and permit horizontal movement of the hospital ship 50 relative to the quay 2.

The horizontal movement restrainer 8 according to this exemplary embodiment is a rod-shaped or arm-shaped elongate structure. The horizontal movement restrainer 8 includes a first end 81 as one longitudinal end and a second end 82 as the other longitudinal end. The horizontal movement restrainer 8 is a rigid body and made of, for example, a steel material such as mold steel.

The first end 81 of the horizontal movement restrainer 8 is fastened to a mooring point 23 located on the quay 2 by a fastener such as a bolt. The second end 82 of the horizontal movement restrainer 8 is coupled to a link 53 located on the hull of the hospital ship 50 by a fastener such as a bolt. At least one of the first and second ends 81 and 82 of the horizontal movement restrainer 8 may be connected by a pin joint that allows the horizontal movement restrainer 8 to pivot horizontally.

In this exemplary embodiment, the horizontal movement restrainers 8 include two horizontal movement restrainers 8 one of which is a first horizontal movement restrainer 8a connecting the portside of the hospital ship 50 to the quay 2 in the ship width direction and the other of which is a second horizontal movement restrainer 8b connecting the stern of the hospital ship 50 to the quay 2 in the ship length direction. Thus, the hospital ship 50 is restricted from moving horizontally relative to the quay 2. The locations at which the horizontal movement restrainers 8 are coupled to the hospital ship 50 and the number of the horizontal movement restrainers 8 are not limited to those in the above example, and any number of horizontal movement restrainers 8 may be coupled at any locations as long as the hospital ship 50 is restricted from moving horizontally relative to the quay 2.

Mooring Method

The following will describe procedures for mooring the hospital ship 50 to the berth 6 in the harbor structure 1. The mooring is desirably carried out at high tide.

Figure 3:
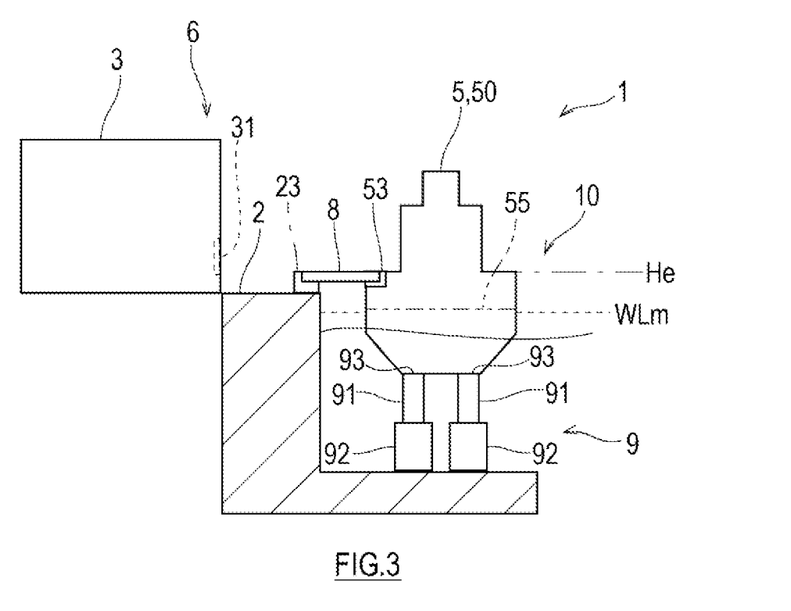
FIG. 3 is a cross-sectional view of the harbor structure and illustrates a state in which a ship is situated at a specified level.

First, the hospital ship 50 is placed alongside the quay 2, stopped in the berthing zone 10, and anchored. The pillars 91 of the vertical movement restrainer 9 are then raised. In the first raising step, each pillar 91 is raised until its ship bottom support 93 comes into contact with the bottom of the hospital ship 50. In the second raising step, all of the pillars 91 are raised in a balanced manner to lift the hospital ship 50 to the specified level without tilting the hospital ship 50. FIG. 3 is a cross-sectional view of the harbor structure 1 and illustrates a state in which the hospital ship 50 is situated at the specified level. As shown in FIG. 3, part of the weight of the hospital ship 50 situated at the specified level is supported by the pillars 91. The hospital ship 50 supported by the vertical movement restrainer 9 is prevented from moving vertically downward. Even in case that the sea level rises due to the tide, to the extent that the hospital ship 50 is supported by the pillars 91, the hospital ship 50 does not float upward but remains supported by the vertical movement restrainer 9 and makes no vertically upward movement. As described above, the vertical movement restrainer 9 lifts the hospital ship 50 to the specified level and restricts vertical movement of the hospital ship 50 relative to the quay 2.

A planned minimum draft line 55 of the hospital ship 50 situated at the specified level is desirably located above a planned maximum sea level WLm. The "planned minimum draft line 55" is a horizontal line structurally defined for the hospital ship 50 and a design draft line defined on the assumption that the hospital ship 50 is minimally equipped. The "planned maximum sea level WLm" may be an average of sea levels observed at spring high tide in the berthing zone 10 or an all-time high sea level in the berthing zone 10. Thus, even at spring high tide, the hospital ship 50 lifted to the specified level by the vertical movement restrainer 9 does not float upward but remains supported by the vertical movement restrainer 9 and makes no vertically upward movement from the specified level.

Subsequently, the quay 2 and the hospital ship 50 are connected by the horizontal movement restrainers 8. The horizontal movement restrainers 8 restrict horizontal movement of the hospital ship 50 relative to the quay 2. Thus, the hospital ship 50 is restricted from moving vertically or horizontally relative to the quay 2.

Referring back to FIG. 1, the boarding gate 51 of the hospital ship 50 and the quay-facing gate 31 of the building 3 may be connected by a boarding bridge 35 to allow people or goods to come and go smoothly between the hospital ship 50 and the building 3. In this exemplary embodiment, where the vertical location He of the boarding gate 51 and the vertical location of the quay-facing gate 31 are substantially the same, the path on the boarding bridge 35 is generally horizontal and suitable especially for transfer of devices or patients placed on carts. When there is a level difference between the boarding gate 51 and the quay-facing gate 31, the boarding gate 51 and the quay-facing gate 31 may be connected by the boarding bridge 35 including a slope meeting barrier-free design standards.

Figure 4:
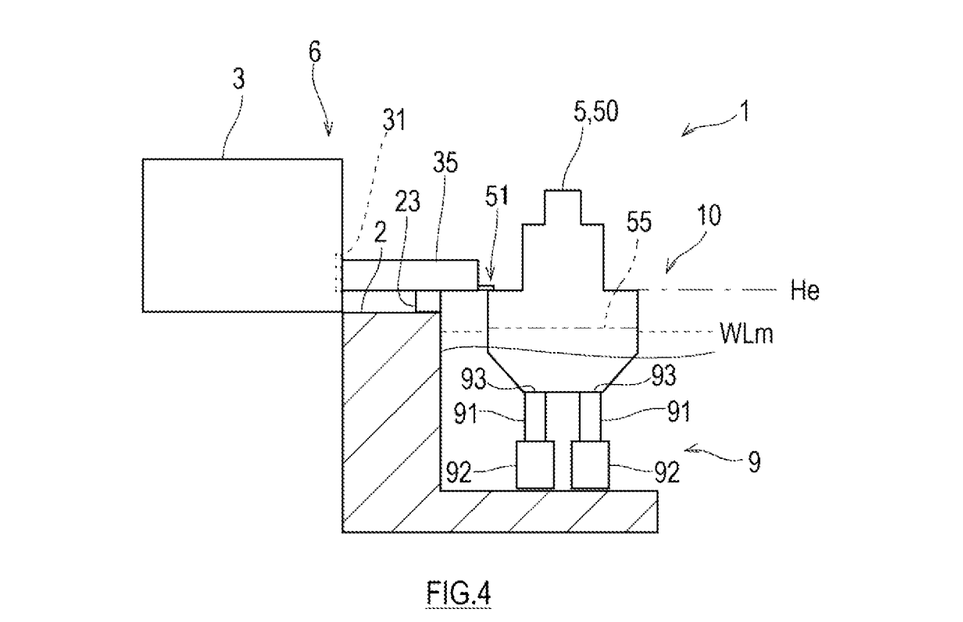
FIG. 4 is a cross-sectional view of the harbor structure and illustrates a state in which the ship and a building are connected by a boarding bridge.

The boarding bridge 35 may be mounted on the building 3, quay 2, or hospital ship 50. The boarding bridge 35 may function as a horizontal movement restrainer 8. That is, the quay 2 and the hospital ship 50 may be connected by the boarding bridge 35. For example, as shown in FIG. 4, the boarding bridge 35 may be configured to be rigidly connected to the mooring point 23 of the quay 2 and the hospital ship 50 and thus restrict horizontal movement of the hospital ship 50 relative to the quay 2.

The hospital ship 50 moored to the quay 2 in the above manner and staying in the berth 6 can be used in ordinary times as an auxiliary structure for the building 3 or a structure that enhances the functionality of the building 3. The hospital ship 50 maintains a constant position relative to the quay 2 without rocking under the effect of wind, waves, and tide. Thus, on-board activities are not limited due to rocking motions.

Departure Method

The hospital ship 50 departs from the berth 6 in the event of an emergency. The following will describe procedures for the departure. The departure is desirably carried out at high tide.

First, patients and pieces of equipment unnecessary for the departure are transferred from the hospital ship 50 to the building 3, and pieces of equipment, materials, and staff necessary for the departure are brought into the hospital ship 50. Next, the boarding bridge 35 is disconnected from the hospital ship 50, and the horizontal movement restrainers 8 are disconnected from the hospital ship 50. In the case where the horizontal movement restrainers 8 are mounted on the hospital ship 50, the horizontal movement restrainers 8 are disconnected from the quay 2. This permits the hospital ship 50 to move horizontally relative to the quay 2.

Subsequently, the pillars 91 of the vertical movement restrainer 9 are lowered. The hospital ship 50 descends gradually as the pillars 91 are lowered. The pillars 91 are lowered until the ship bottom supports 93 are detached from the bottom of the hospital ship 50, namely until the pillars 91 cease to support the hospital ship 50. This permits the hospital ship 50 to move vertically relative to the quay 2. As a result, the hospital ship 50 becomes able to move vertically and horizontally relative to the quay 2. The hospital ship 50 weighs anchor and departs for the destination.

Summary

As described above, a harbor structure 1 according to this exemplary embodiment includes:
- a multi-purpose disaster response ship 5 (e.g., a hospital ship 50);
- a berth 6 including
  - a quay 2 at which the multi-purpose disaster response ship 5 is berthed, and
  - a building 3 located along the quay 2, including at least one quay-facing gate 31, and sharing at least one common purpose with the multi-purpose disaster response ship 5;
- a horizontal movement restrainer 8 mounted on the multi-purpose disaster response ship 5 or the berth 6 to restrict and permit horizontal movement of the multi-purpose disaster response ship 5 relative to the quay 2; and
- a vertical movement restrainer 9 that adjusts a vertical location of the multi-purpose disaster response ship 5 to a specified level relative to the building 3 and that restricts and permits vertical movement of the multi-purpose disaster response ship 5 situated at the specified level.

As described above, a berth 6 according to this exemplary embodiment includes:
- a quay 2 at which a multi-purpose disaster response ship 5 is berthed;
- a building 3 located along the quay 2, including at least one quay-facing gate 31, and sharing at least one common purpose with the multi-purpose disaster response ship 5;
- a horizontal movement restrainer 8 mounted on the multi-purpose disaster response ship 5 or the quay 2 to restrict and permit horizontal movement of the multi-purpose disaster response ship 5 relative to the quay 2; and
- a vertical movement restrainer 9 that adjusts a vertical location of the multi-purpose disaster response ship 5 to a specified level relative to the building 3 and that restricts and permits vertical movement of the multi-purpose disaster response ship 5 situated at the specified level.

In the berth 6 for the multi-purpose disaster response ship 5 and the harbor structure 1 which are configured as described above, the horizontal movement restrainer 8 restricts horizontal movement of the multi-purpose disaster response ship 5 relative to the quay 2. Additionally, the vertical movement restrainer 9 adjusts the vertical location He of the boarding gate 51 of the multi-purpose disaster response ship 5 into a given relationship with the vertical location of the quay-facing gate 31 and restricts vertical movement of the multi-purpose disaster response ship 5 relative to the quay 2. This allows the multi-purpose disaster response ship 5 to maintain a constant position relative to the building 3 (or the quay 2 to which the building 3 is secured) without rocking under the effect of wind, waves, and tide. Thus, in ordinary times, the multi-purpose disaster response ship 5 can stay in the berth 6 or harbor structure 1 without rocking, and on-board activities are not limited due to rocking motions. As such, in ordinary times, the multi-purpose disaster response ship 5 can be used as an auxiliary structure for the building 3 or a structure that enhances the functionality of the building 3. In times of emergency, the multi-purpose disaster response ship 5 can be quickly made ready for departure by removing the restrictions imposed by the horizontal and vertical movement restrainers 8 and 9.

In the harbor structure 1 and berth 6 according to this exemplary embodiment, the vertical location He of the boarding gate 51 may be substantially the same as the vertical location of the quay-facing gate 31 of the building 3.

In this case where the vertical location He of the boarding gate 51 is substantially the same as the vertical location of the quay-facing gate 31 of the building 3, a path (e.g., the boarding bridge 35 of FIG. 1 or 5) disposed to connect the two gates can be generally horizontal, and such a path is beneficial for transfer of goods and comings and goings of people.

Desirably, a planned minimum draft line 55 of the multi-purpose disaster response ship 5 situated at the specified level is located above a planned maximum sea level WLm defined with respect to the quay 2. The planned maximum sea level WLm is an average of sea levels observed at spring high tide or an all-time high sea level.

In this case, even in the event that the sea level rises due to the tide or surge, the multi-purpose disaster response ship 5 situated at the specified level remains supported by the pillars 91 and does not float upward.

In the harbor structure 1 and berth 6 according to this exemplary embodiment, the vertical movement restrainer 9 includes: at least three pillars 91 mounted on the berth 6 to support the bottom of the multi-purpose disaster response ship 5; and an elevator 92 mounted on the berth 6 to raise and lower the pillars 91, and the vertical movement restrainer 9 lifts the multi-purpose disaster response ship 5 to the specified level by raising the pillars 91. Part of the weight of the multi-purpose disaster response ship 5 situated at the specified level is supported by the pillars 91.

With the vertical movement restrainer 9 configured as described above, vertical movement of the multi-purpose disaster response ship 5 can be restricted (limited) by raising the pillars 91 and allowing the pillars 91 to support the multi-purpose disaster response ship 5. Additionally, lowering the pillars 91 away from the multi-purpose disaster response ship 5 permits the multi-purpose disaster response ship 5 to move vertically.

The harbor structure 1 and berth 6 according to this exemplary embodiment further include a generally horizontal boarding bridge 35 mounted on the quay 2, the multi-purpose disaster response ship 5, or the building 3 and extending between the boarding gate 51 of the multi-purpose disaster response ship 5 and the quay-facing gate 31 of the building 3.

In the example described above, at least one of the horizontal movement restrainers 8 may function as the boarding bridge 35 extending between the boarding gate 51 of the multi-purpose disaster response ship 5 and the quay-facing gate 31.

In this case where there is the boarding bridge 35 connecting the building 3 and the multi-purpose disaster response ship 5, the building 3 and the multi-purpose disaster response ship 5 can be connected by a generally horizontal direct path. This makes it easier for people to come and go between the building 3 and the multi-purpose disaster response ship 5. Additionally, in times of emergency, pieces of equipment or goods can be quickly transferred from the multi-purpose disaster response ship 5 to the building 3 (and vice versa).

In the harbor structure 1 and berth 6 according to this exemplary embodiment, the building 3 is a medical facility, and the multi-purpose disaster response ship 5 is a hospital ship 50.

In accordance with the present disclosure, as described above, the hospital ship 50 can be used in ordinary times as an auxiliary structure for an onshore medical facility or a structure that enhances the function of a hospital. In times of emergency, the hospital ship 50 can be made ready for departure merely by transferring patients from the hospital ship 50 to the adjacent medical facility and can depart quickly.

Variants

Figure 5:
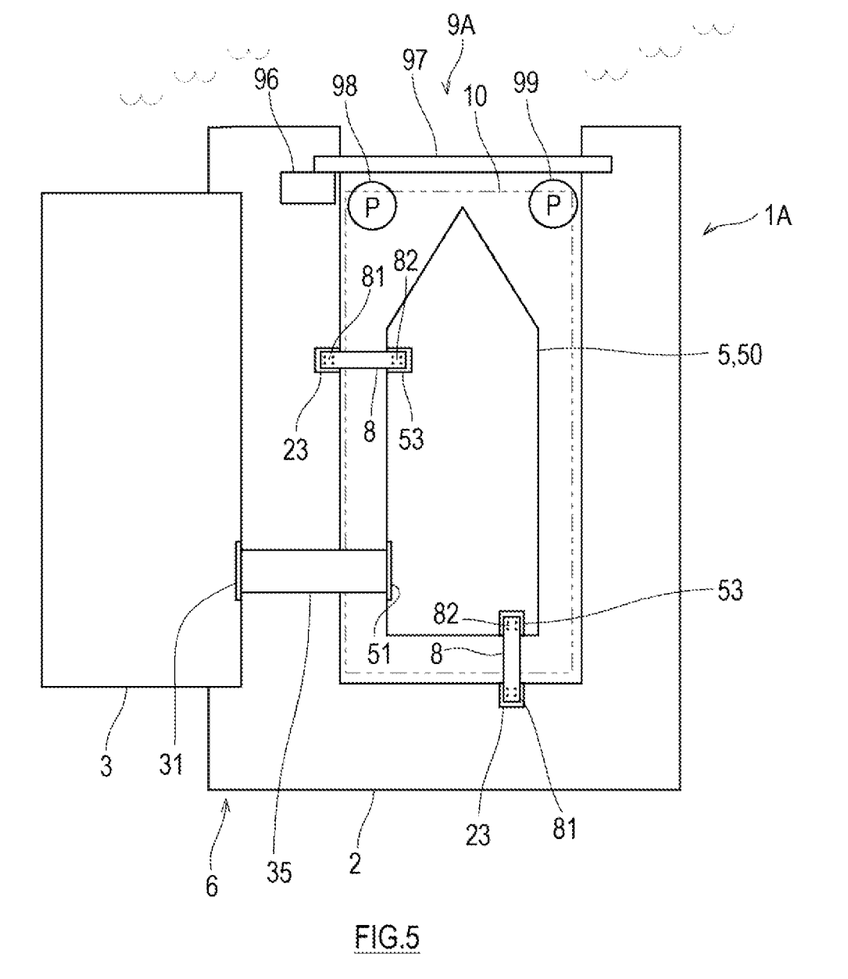
FIG. 5 is a plan view showing the overall configuration of a harbor structure according to a variant.

Hereinafter, variants of the harbor structure 1 and berth 6 according to the above exemplary embodiment will be described. FIG. 5 is a plan view showing the overall configuration of a harbor structure 1A according to a variant. The harbor structure 1A of FIG. 5 differs in the configuration of the vertical movement restrainer 9 from the harbor structure 1 according to the above exemplary embodiment. In the following description, the vertical movement restrainer 9A of the harbor structure 1A will be discussed in detail. The elements identical or similar to those of the above exemplary embodiment are denoted by the same reference signs in the drawings and will not be described in detail.

Figure 6:
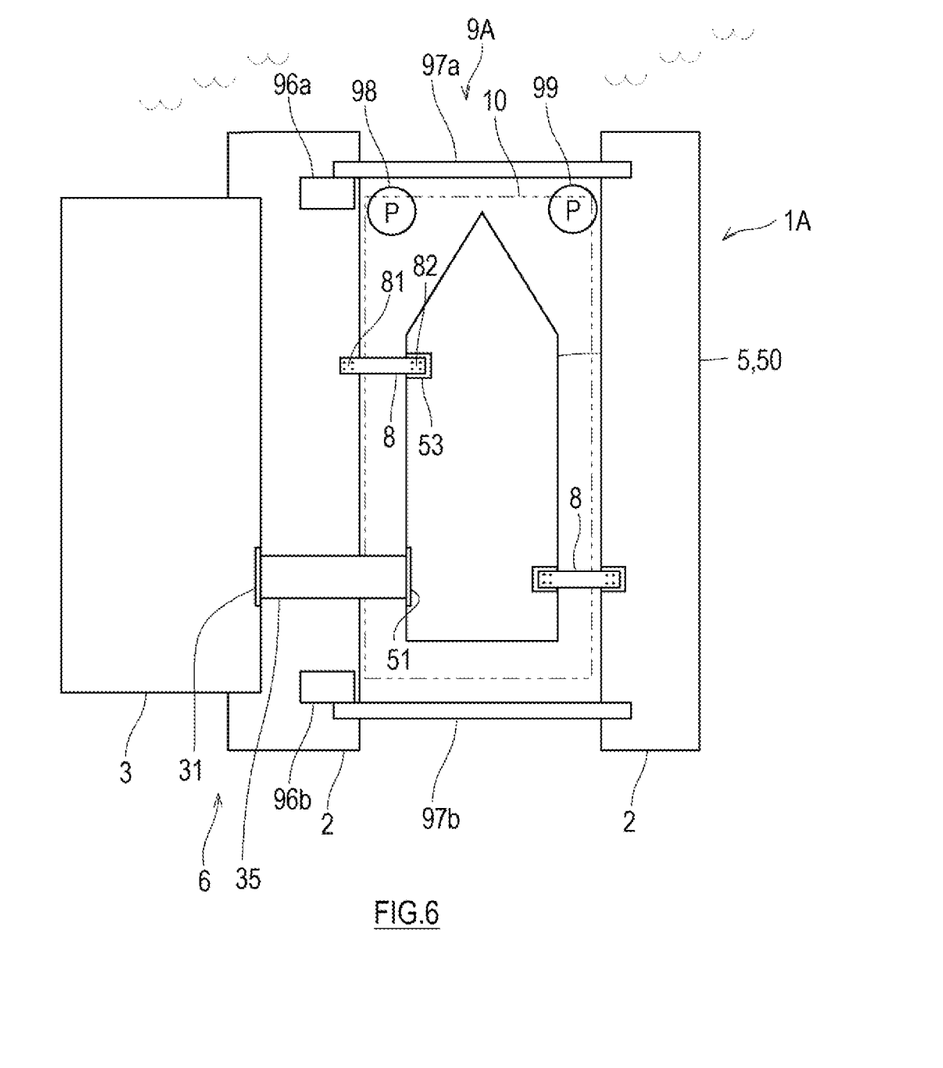
FIG. 6 is a plan view showing the overall configuration of the harbor structure according to the variant and illustrates an alternative form of quay.

As shown in FIG. 5, the quay 2 in the harbor structure 1A is located along at least two of the four sides of the berthing zone 10 as viewed in plan. In the example of FIG. 5, the wall of the quay 2 is located along three adjacent sides of the four sides of the berthing zone 10 as viewed in plan so that the wall of the quay 2 faces the starboard side, portside, and stern of the hospital ship 50. A sluice gate 97 is located along the other one of the four sides of the berthing zone 10 as viewed in plan. The sluice gate 97 is opened and closed by a sluice gate actuator 96. Alternatively, as shown in FIG. 6, the wall of the quay 2 may be located along two of the four sides of the berthing zone 10 as viewed in plan so that the wall of the quay 2 faces the starboard side and portside of the hospital ship 50, and sluice gates 97a and 97b may be located along the other two of the four sides of the berthing zone 10 as viewed in plan. In this case, sluice gate actuators 96a and 96b operable independently of each other are mounted on the sluice gates 97a and 97b, respectively.

Referring back to FIG. 5, with the sluice gate 97 closed, the berthing zone 10 is isolated from the surrounding environment, and the flow of seawater is blocked between the berthing zone 10 and the surrounding environment. With the sluice gate 97 open, the berthing zone 10 is open to the surrounding environment, and seawater can flow between the berthing zone 10 and the surrounding environment. The "surrounding environment" of the berthing zone 10 is defined herein as the sea outside the sluice gate 97.

The vertical movement restrainer 9A includes the sluice gate 97, the sluice gate actuator 96 that opens and closes the sluice gate 97, a discharge pump 98 that discharges seawater from the berthing zone 10, and a feed pump 99 that feeds seawater into the berthing zone 10. The discharge and feed pumps 98 and 99 may be mounted on the hospital ship 50 or berth 6. A single pump may serve the functions of the discharge and feed pumps 98 and 99.

Mooring Method

The following will describe procedures for mooring the hospital ship 50 to the berth 6 in the harbor structure 1A.

Figure 7:
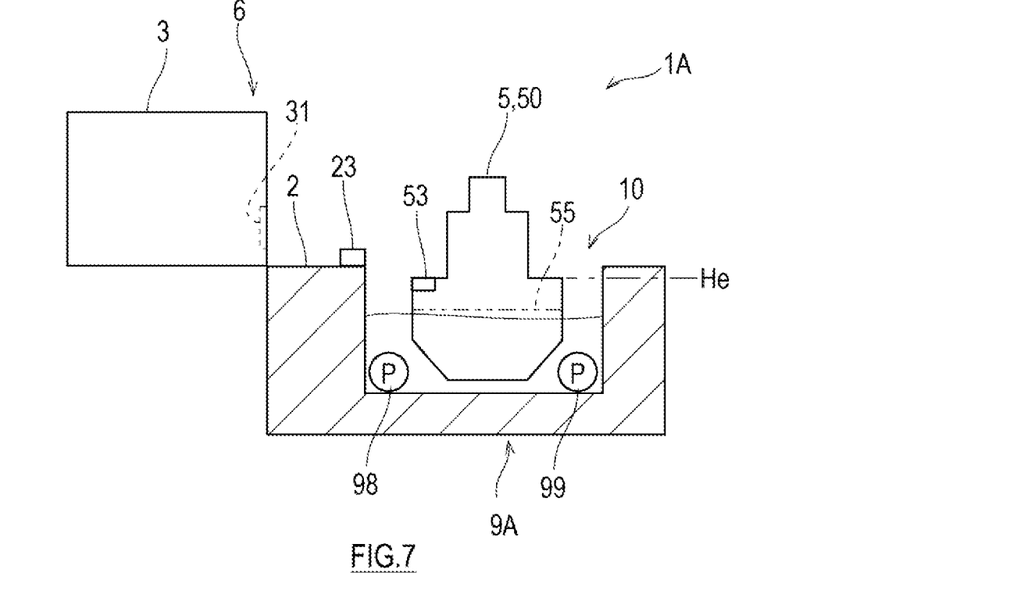
FIG. 7 is a cross-sectional view of the harbor structure according to the variant and illustrates the configuration of a vertical movement restrainer.

First, the hospital ship 50 is placed alongside the quay 2, stopped in the berthing zone 10, and anchored. As shown in FIGS. 5 and 7, the vertical location He of the boarding gate 51 of the hospital ship 50 floating on water in the berthing zone 10 is at a lower level than the quay-facing gate 31 of the building 3.

Figure 8:
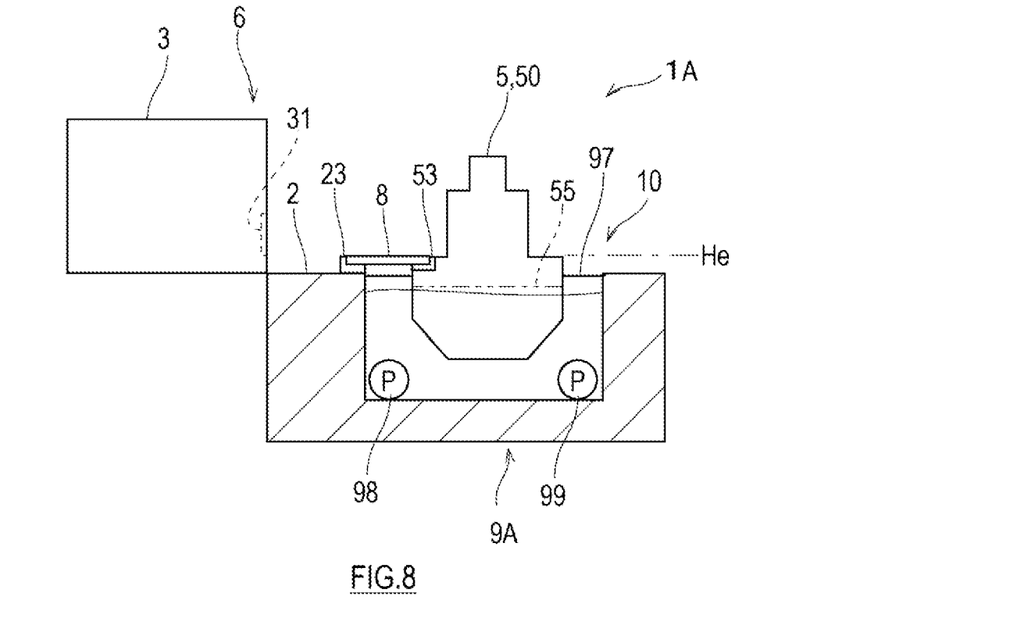
FIG. 8 is a cross-sectional view of the harbor structure according to the variant and illustrates a state in which a ship is situated at a specified level.

Next, the sluice gate actuator 96 is operated to close the sluice gate 97. Subsequently, the feed pump 99 is operated to feed seawater into the berthing zone 10 until the hospital ship 50 reaches a specified level relative to the quay 2. FIG. 8 is a cross-sectional view of the harbor structure 1A and illustrates a state in which the hospital ship 50 is situated at the specified level. As shown in FIGS. 5 and 8, the vertical location He of the boarding gate 51 of the hospital ship 50 situated at the specified level is substantially the same as the vertical level of the quay-facing gate 31 of the building 3. The phrase "substantially the same" is intended to encompass the case where a straight line drawn between the boarding gate 51 of the hospital ship 50 and the quay-facing gate 31 of the building 3 is horizontal and the case where the gradient of the straight line is $1/12$ or less.

The hospital ship 50 thus lifted to the specified level by the vertical movement restrainer 9A floats in the berthing zone 10. The berthing zone 10 is surrounded on all four sides by the quay 2 and the sluice gate 97, and seawater does not flow into or out of the berthing zone 10. Thus, the hospital ship 50 does not rock due to the effect of tide or waves, and the water level remains generally constant. As such, the vertical level of the hospital ship 50 relative to the quay 2 is held at the specified level. This means that the hospital ship 50 is restricted from moving vertically. In the manner described above, the vertical movement restrainer 9A lifts the hospital ship 50 to the specified level and restricts vertical movement of the hospital ship 50 relative to the quay 2.

Subsequently, the quay 2 and the hospital ship 50 are connected by the horizontal movement restrainers 8. The horizontal movement restrainers 8 restrict horizontal movement of the hospital ship 50 relative to the quay 2. Thus, the hospital ship 50 is restricted from moving vertically or horizontally relative to the quay 2 and is not carried by wind.

The boarding gate 51 of the hospital ship 50 situated at the specified level and the quay-facing gate 31 of the building 3 are at substantially the same level. The boarding gate 51 of the hospital ship 50 and the quay-facing gate 31 of the building 3 may be connected by the boarding bridge 35. The boarding bridge 35 may be mounted on the building 3, quay 2, or hospital ship 50. The boarding bridge 35 may function as a horizontal movement restrainer 8.

The hospital ship 50 moored to the quay 2 in the above manner and staying in the berth 6 can be used in ordinary times as an auxiliary structure for the building 3 or a structure that enhances the functionality of the building 3. The hospital ship 50 maintains a constant position relative to the quay 2 without rocking under the effect of wind, waves, and tide. Thus, on-board activities are not limited due to rocking motions.

Departure Method

The hospital ship 50 departs from the berth 6 in the event of an emergency. First, patients and pieces of equipment unnecessary for the departure are transferred from the hospital ship 50 to the building 3, and pieces of equipment, materials, and staff necessary for the departure are brought into the hospital ship 50. Next, the boarding bridge 35 is disconnected from the hospital ship 50, and the horizontal movement restrainers 8 are disconnected from the hospital ship 50. In the case where the horizontal movement restrainers 8 are mounted on the hospital ship 50, the horizontal movement restrainers 8 are disconnected from the quay 2. This permits the hospital ship 50 to move horizontally relative to the quay 2.

Subsequently, the vertical movement restrainer 9A is operated to lower the hospital ship 50 relative to the quay 2. Specifically, the discharge pump 98 is operated to discharge seawater from the berthing zone 10 until the water level in the berthing zone 10 becomes generally equal to the water level in the surrounding environment. The sluice gate actuator 96 is then operated to open the sluice gate 97. This permits the hospital ship 50 to move vertically. In this manner, the hospital ship 50 becomes able to move vertically and horizontally relative to the quay 2. The hospital ship 50 weighs anchor and departs for the destination.

In the harbor structure 1A according to this variant, as described above, there is the berthing zone 10 tailored to the multi-purpose disaster response ship 5 and generally rectangular in plan, the quay 2 is located along at least two of the four sides of the berthing zone 10 as viewed in plan, and the vertical movement restrainer 9A according to the variant is disposed instead of the vertical movement restrainer 9 according to the above exemplary embodiment.

In the berth 6 for the multi-purpose disaster response ship 5 according to this variant, there is the berthing zone 10 tailored to the multi-purpose disaster response ship 5 and generally rectangular in plan, the quay 2 is located along at least two of the four sides of the berthing zone 10 as viewed in plan, and the vertical movement restrainer 9A according to the variant is disposed instead of the vertical movement restrainer 9 according to the above exemplary embodiment.

The vertical movement restrainer 9A includes: a sluice gate 97 located along the other one (or sluice gates 97a and 97b located along the other two) of the four sides of the berthing zone 10 as viewed in plan; a sluice gate actuator 96 that opens and closes the sluice gate 97 (or sluice gate actuators 96a and 96b that open and close the sluice gates 97a and 97b); a discharge pump 98 that discharges seawater from the berthing zone 10; and a feed pump 99 that feeds seawater into the berthing zone 10. The vertical movement restrainer 9 raises the multi-purpose disaster response ship 5 to the specified level by operating the feed pump 99 to feed seawater into the berthing zone 10 closed by the sluice gate 97, and lowers the multi-purpose disaster response ship 5 by operating the discharge pump 98 to discharge seawater from the berthing zone 10. The discharge and feed pumps 98 and 99 may be mounted on the multi-purpose disaster response ship 5 or the quay 2 (berthing zone 10).

In the harbor structure 1A and berth 6 configured as described above, the multi-purpose disaster response ship 5 can be raised to and held at the specified level without applying any external force to the hull of the multi-purpose disaster response ship 5.

Although the foregoing has described a preferred embodiment (and its variant) of the present disclosure, the scope of the present disclosure embraces modifications made to the details of the structures and/or functions of the above embodiment without departing from the gist of the present disclosure. Examples of possible modifications to the above configurations will be described below.

For example, although the multi-purpose disaster response ship 5 is a hospital ship 50 in the above embodiment and its variant, the multi-purpose disaster response ship 5 is not limited to the hospital ship 50. The multi-purpose disaster response ship 5 may be any kind of ship usable for medical activities, search and rescue of missing people, transportation of manpower and goods, support activities for disaster victims (e.g., provision of foodstuffs, water, and bath service), and other disaster-related purposes. For example, in the case where the multi-purpose disaster response ship 5 is a relief ship adapted for support activities for disaster victims (e.g., provision of foodstuffs, water, and bath service), the building 3 may be an accommodation facility. For example, in the case where the multi-purpose disaster response ship 5 is a ship including a rehabilitation installation, the building 3 may be a building for storage of pieces of equipment for rehabilitation.

The invention claimed is:

1. A berth for a multi-purpose disaster response ship, comprising:
    a quay at which the multi-purpose disaster response ship is berthed;
    a building located along the quay, including at least one quay-facing gate, and sharing at least one common purpose with the multi-purpose disaster response ship;
    a horizontal movement restrainer that restricts and permits horizontal movement of the multi-purpose disaster response ship relative to the quay; and
    a vertical movement restrainer that adjusts a vertical location of the multi-purpose disaster response ship to a specified level relative to the building and that restricts and permits vertical movement of the multi-purpose disaster response ship situated at the specified level.

2. The berth according to claim 1, wherein a vertical location of a boarding gate of the multi-purpose disaster response ship situated at the specified level is substantially the same as a vertical location of the quay-facing gate.

3. The berth according to claim 1, wherein
    a planned minimum draft line of the multi-purpose disaster response ship situated at the specified level is located above a planned maximum sea level defined with respect to the quay, and
    the planned maximum sea level is an average of sea levels observed at spring high tide or an all-time high sea level.

4. The berth according to claim 1, wherein
    the vertical movement restrainer includes: at least three pillars that support a bottom of the multi-purpose disaster response ship; and an elevator that raises and lowers the pillars, and
    the vertical movement restrainer lifts the multi-purpose disaster response ship to the specified level by raising the pillars.

5. The berth according to claim 1, wherein
    there is a berthing zone tailored to the multi-purpose disaster response ship and generally rectangular in plan,
    the quay is located along at least two of four sides of the berthing zone as viewed in plan,
    the vertical movement restrainer includes: a sluice gate located along the other one or two of the four sides of the berthing zone as viewed in plan; a sluice gate actuator that opens and closes the sluice gate; a discharge pump that discharges seawater from the berthing zone; and a feed pump that feeds seawater into the berthing zone, and
    the vertical movement restrainer raises the multi-purpose disaster response ship to the specified level by operating the feed pump to feed seawater into the berthing zone closed by the sluice gate, and lowers the multi-purpose disaster response ship by operating the discharge pump to discharge seawater from the berthing zone.

6. The berth according to claim 1, further comprising a generally horizontal boarding bridge extending between a boarding gate of the multi-purpose disaster response ship and the quay-facing gate of the building.

7. The berth according to claim 1, wherein the horizontal movement restrainer functions as a boarding bridge extending between a boarding gate of the multi-purpose disaster response ship and the quay-facing gate.

8. The berth according to claim 1, wherein
the building is a medical facility, and
the multi-purpose disaster response ship is a hospital ship.

9. A harbor structure comprising:
a multi-purpose disaster response ship;
a quay at which the multi-purpose disaster response ship is berthed;
a building located along the quay, including at least one quay-facing gate, and sharing at least one common purpose with the multi-purpose disaster response ship;
a horizontal movement restrainer mounted on the multi-purpose disaster response ship or the quay to restrict and permit horizontal movement of the multi-purpose disaster response ship relative to the quay; and
a vertical movement restrainer that adjusts a vertical location of the multi-purpose disaster response ship to a specified level relative to the quay and that restricts and permits vertical movement of the multi-purpose disaster response ship situated at the specified level.

10. The harbor structure according to claim 9, wherein a vertical location of a boarding gate of the multi-purpose disaster response ship situated at the specified level is substantially the same as a vertical location of the quay-facing gate.

11. The harbor structure according to claim 9, wherein
a planned minimum draft line of the multi-purpose disaster response ship situated at the specified level is located above a planned maximum sea level defined with respect to the quay, and
the planned maximum sea level is an average of sea levels observed at spring high tide or an all-time high sea level.

12. The harbor structure according to claim 9, wherein
the vertical movement restrainer includes: at least three pillars that support a bottom of the multi-purpose disaster response ship; and an elevator that raises and lowers the pillars, and
the vertical movement restrainer lifts the multi-purpose disaster response ship to the specified level by raising the pillars.

13. The harbor structure according to claim 9, wherein
there is a berthing zone tailored to the multi-purpose disaster response ship and generally rectangular in plan,
the quay is located along at least two of four sides of the berthing zone as viewed in plan,
the vertical movement restrainer includes: a sluice gate located along the other one or two of the four sides of the berthing zone as viewed in plan; a sluice gate actuator that opens and closes the sluice gate; a discharge pump mounted on the multi-purpose disaster response ship or the quay to discharge seawater from the berthing zone; and a feed pump mounted on the multi-purpose disaster response ship or the quay to feed seawater into the berthing zone, and
the vertical movement restrainer raises the multi-purpose disaster response ship to the specified level by operating the feed pump to feed seawater into the berthing zone closed by the sluice gate, and lowers the multi-purpose disaster response ship by operating the discharge pump to discharge seawater from the berthing zone.

14. The harbor structure according to claim 9, further comprising a generally horizontal boarding bridge mounted on the multi-purpose disaster response ship, the quay, or the building and extending between a boarding gate of the multi-purpose disaster response ship and the quay-facing gate.

15. The harbor structure according to claim 9, wherein the horizontal movement restrainer functions as a boarding bridge extending between a boarding gate of the multi-purpose disaster response ship and the quay-facing gate.

16. The harbor structure according to claim 9, wherein
the building is a medical facility, and
the multi-purpose disaster response ship is a hospital ship.

\* \* \* \* \*